(12) United States Patent  
Higgs

(10) Patent No.: US 7,665,896 B1  
(45) Date of Patent: Feb. 23, 2010

(54) PLASTIC BAG TO FACILITATE EVACUATION PRIOR TO SEALING

(75) Inventor: James R. Higgs, Garden Grove, CA (US)

(73) Assignee: Circle Back, Inc., Fullerton, CA (US)

( * ) Notice: Subject to any disclaimer, the term of this patent is extended or adjusted under 35 U.S.C. 154(b) by 652 days.

(21) Appl. No.: 11/159,470

(22) Filed: Jun. 23, 2005

(51) Int. Cl.
*B65D 33/01* (2006.01)
*B65D 33/00* (2006.01)
*B65D 81/20* (2006.01)

(52) U.S. Cl. ............... 383/100; 383/105; 206/524.8
(58) Field of Classification Search ............ 383/100, 383/35, 101, 103, 105, 112; 206/524.8
See application file for complete search history.

(56) References Cited

U.S. PATENT DOCUMENTS

| | | | |
|---|---|---|---|
| 2,778,171 A | | 1/1957 | Taunton |
| 2,778,173 A | | 1/1957 | Taunton |
| 4,756,422 A | | 7/1988 | Kristen |
| 4,941,310 A | | 7/1990 | Kristen |
| 5,554,423 A | | 9/1996 | Abate |
| 6,403,174 B1 * | 6/2002 | Copeta | .............. 428/34.1 |
| 6,607,097 B2 | | 8/2003 | Savage et al. |
| 6,799,680 B2 | | 10/2004 | Mak |
| 6,883,665 B1 * | 4/2005 | Ahn | .................. 206/524.8 |
| 7,270,238 B2 * | 9/2007 | Shannon | ............... 206/524.8 |
| 2004/0007494 A1 * | 1/2004 | Popeil et al. | ........... 206/524.8 |
| 2004/0050745 A1 * | 3/2004 | Lee et al. | ................ 206/524.8 |
| 2005/0281489 A1 * | 12/2005 | Yeh et al. | ..................... 383/35 |
| 2006/0073291 A1 * | 4/2006 | Wu | ........................ 428/35.2 |
| 2008/0152267 A1 * | 6/2008 | Shannon | ................... 383/113 |

* cited by examiner

*Primary Examiner*—Jes F Pascua
(74) *Attorney, Agent, or Firm*—Blakely Sokoloff Taylor & Zafman, LLP

(57) ABSTRACT

A plastic bag formed from two panels of substantially rectangular plastic film that includes an oxygen barrier and a heat sealable surface. The panels are joined by three edges with the heat sealable surfaces facing one another. At least one of the panels includes a number of air channels. Each of the air channels has first and second opposing ends. The first end of each air channel is adjacent an unjoined edge of the panel. Each air channel extends toward the joined edges from the first end to the second end. The second end of each air channel is closer to the unjoined edge than the joined edges. Each air channel is spaced apart from an adjacent air channel by no more than a first distance. Each second end is spaced apart from an adjacent second end by a second distance that is greater than the first distance.

8 Claims, 2 Drawing Sheets

PLASTIC BAG TO FACILITATE EVACUATION PRIOR TO SEALING

BACKGROUND OF THE INVENTION

Vacuum packaging may be used to store perishables, such as foodstuffs. Storing perishable items in conditions that minimize exposure to oxygen and moisture may slow the degradation of these items during the time they are stored.

Various bags and tubing of plastic sheet material that may be formed into bags may be used for the purpose of vacuum sealing perishables. Tubing may be an extruded seamless tube, a folded sheet with a seam, two sheets joined with two seams, or other structure that provides a tube of plastic sheet material. Unsealed bags may be a length of tubing that is sealed with a seam at one end that is typically regarded as the bottom of the bag.

Commercial bags and tubing may consist of an inner layer of heat sealable thermoplastic and an outer layer of gas impermeable material. Additional layers may be used. The material may be uniform in thickness although each of layers may be of a different thickness than other layers. Such bags and tubing are generally inexpensive. Commercial bags may be troublesome to use. Commercial bags may not be evacuated effectively with home-type vacuum packaging machines that do not produce strong vacuums.

Home-type vacuum packaging machines may require the use of bags where the inner bag surface includes channels such as the bags described in U.S. Pat. No. 4,756,422. The channels in the home-type bags prevent the plastic sheets of the bag from clinging completely to the surface of the item being packaged. This may allow evacuation of the bag with a relatively weak suction. The channels may leave a residual volume that contains oxygen and moisture. Even if the bag is evacuated relatively well, the greater the residual volume, the greater the residual oxygen and moisture that the stored item is exposed to. It is desirable to minimize the residual volume when the bag is sealed. It may be particularly desirable to minimize the residual volume immediately adjacent to the stored item.

SUMMARY OF THE INVENTION

A plastic bag formed from two panels of substantially rectangular plastic film that includes an oxygen barrier and a heat sealable surface. The panels are joined by three edges with the heat sealable surfaces facing one another. At least one of the panels includes a number of air channels. Each of the air channels has first and second opposing ends. The first end of each air channel is adjacent an unjoined edge of the panel. Each air channel extends toward the joined edges from the first end to the second end. The second end of each air channel is closer to the unjoined edge than the joined edges. Each air channel is spaced apart from an adjacent air channel by no more than a first distance. Each second end is spaced apart from an adjacent second end by a second distance that is greater than the first distance.

DETAILED DESCRIPTION OF THE INVENTION

The present invention provides a heat sealable plastic bag which is comprised of a heat sealable thermoplastic inner layer and an outer layer of a gas impermeable material. A bag will typically have one inner heat sealable layer and one or more outer layers, each of which will bonded so that no air pockets exist between the layers. The majority of the bag is comprised of flat sheet material that may cling completely to the surface of the item being packaged to minimize the residual volume of a sealed package. A relatively small area of the bag is provided with a novel pattern of embossed air channels that has been found to allow effective evacuation of the bag even with the relatively weak suction typically produced by home-type vacuum sealing devices.

Figure 1:
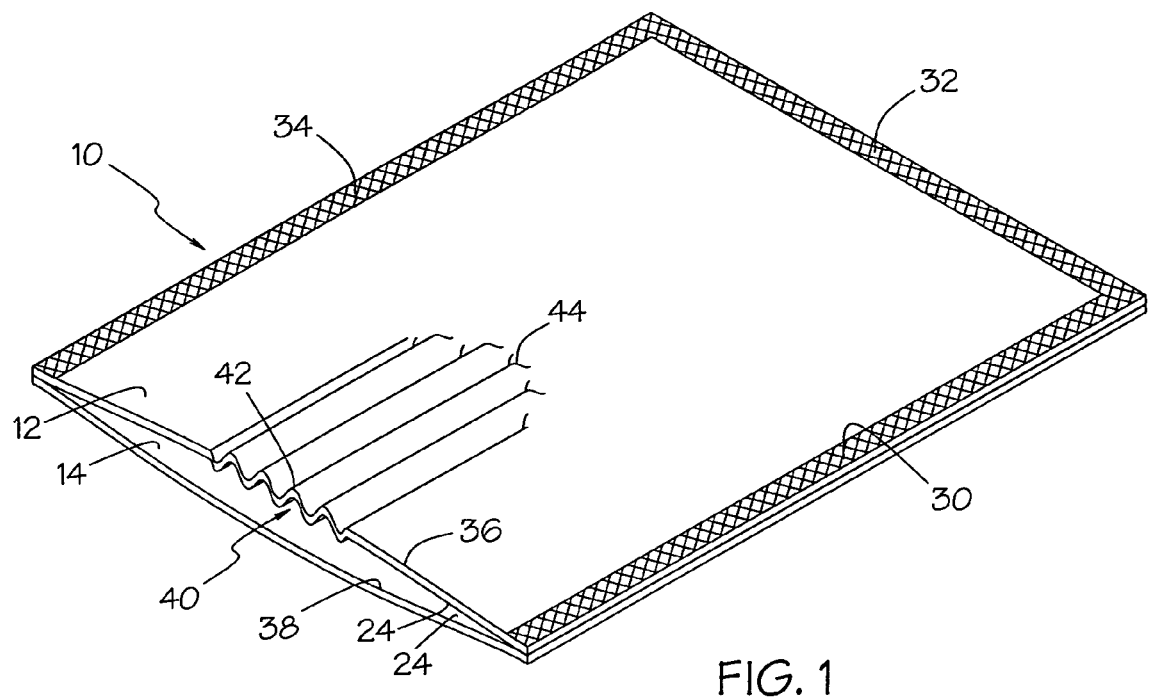
FIG. 1 is a pictorial view of a heat sealable plastic bag that embodies the invention.
Figure 2:
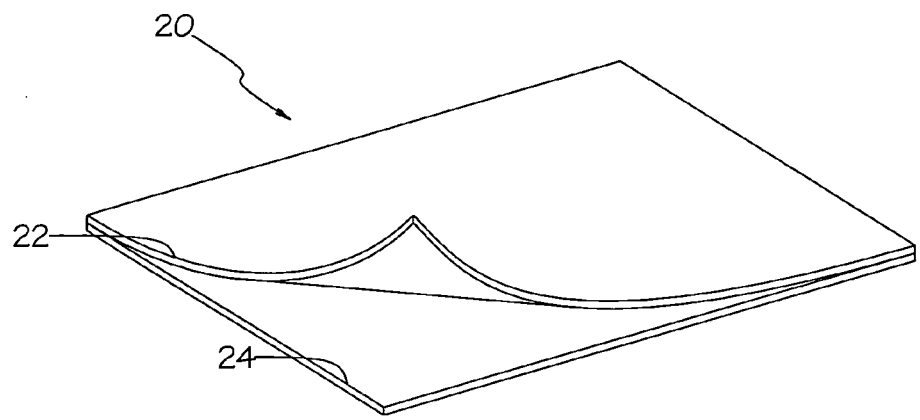
FIG. 2 is a pictorial view illustrating a laminated plastic film that may be used with the invention.

FIG. 1 shows a plastic bag that may be formed from two panels 12, 14 of substantially rectangular plastic film. As shown in FIG. 2 the plastic film 20 may include an oxygen barrier 22 and a heat sealable surface 24. The panels are joined by three edges 30, 32, 34 with the heat sealable surfaces 24 facing one another. At least one of the panels 12 includes a number of air channels 40. Each of the air channels 40 has a first end 42 and a second opposing end 44. The first end 42 of each air channel 40 is adjacent an unjoined edge 36 of the panel 12. Each air channel 40 extends toward the joined edges 32 from the first end 42 to the second end 44.

The second end 44 of each air channel 40 is closer to the unjoined edge 36 than the joined edges 32. Thus a substantial portion of the bag does not include air channels. The air channels provide a path for air flow as the bag is evacuated prior to sealing the unjoined edges 36, 38. It is desirable to remove as much air as possible to minimize the residual oxygen that will be sealed in the bag with the item being packaged. Air is removed by lowering the pressure of the air in the bag and by reducing the volume of the bag to be only slightly more than the volume of the item being packaged. It will be appreciated that the reduction in volume of the bag may be the more significant effect since the bag is flexible and it may not be possible to reduce the pressure in the sealed bag to very much less than atmospheric pressure, particularly with a home-type vacuum sealing machine.

There are two conflicting requirements for the bag. It is desirable that the bag be drawn tightly against the item being packaged to minimize the residual volume of air sealed in the bag. It is necessary that some space be maintained between the panels of the bag so that air can be removed from the bag prior to sealing. It has been discovered that the pattern of air channels provided by a bag that embodies the invention can effectively satisfy these two conflicting requirements.

The pattern of air channels extends less than halfway into the bag and less than across the width of the bag. Preferably the pattern is concentrated approximately in the middle of the width. Thus a large majority of the surfaces of the bag are left flat so that they can be drawn tightly against the surfaces of the item being packaged to minimize residual volume.

The pattern of air channels provide an area where the plastic film has been deformed, possibly by pressure and heat, to form a number of air channels. The pattern of air channels form a corrugated or pleated section in the bag where the peaks of the air channel are resistant to the pressures that tend to flatten the air channels. It is desirable that the air channels be spaced relatively close together in relation to the depth of the air channels since this makes the channels more resistant to crushing by the pressure differential created during evacuation of the bag.

At the second, inner end 44 of the air channel 40 there is a transition from the patterned area that is held open by the corrugations of the air channels to the flat area that remains flexible and capable of being drawn tightly against a surface including the opposite panel. There is a tendency of the flat panels to be drawn together and pinch shut the second end of the air channels as the bag is evacuated. It has been discovered that this tendency toward pinching shut can be counteracted by arranging the second ends 44 of the air channels 40 such that the distance between the adjacent second ends 44 is greater than the distance between adjacent air channels.

Figure 3:
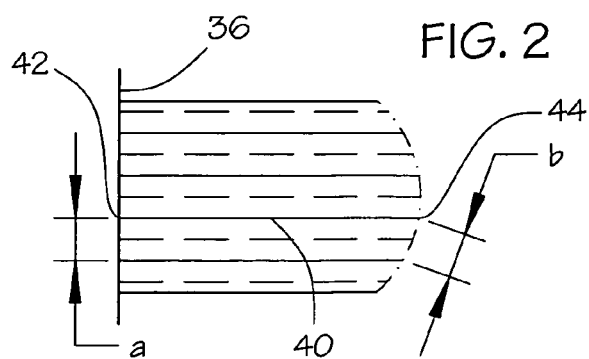
FIG. 3 is a plan view of an embossed pattern of air channels that may be used with the invention.
Figure 4:
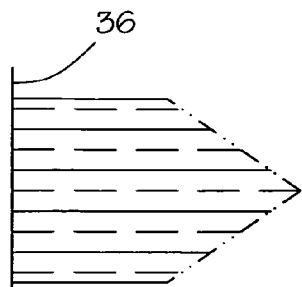
FIGS. 4-8 are plan views of alternate embossed patterns of air channels that may be used with the invention.
Figure 5:
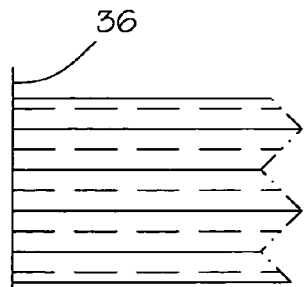
Figure 6:
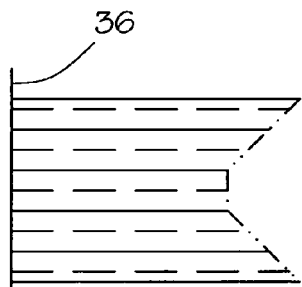
Figure 7:
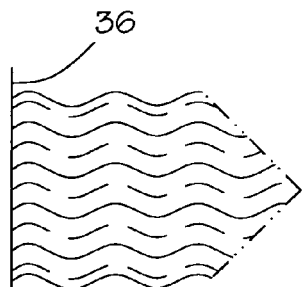

FIG. 3 shows a plan view of the pattern portion of the bag 10 shown in FIG. 1. Solid lines are used to represent the peaks of the pattern where the patterned panel 12 is furthest from the opposite panel 14. Dashed lines represent the valleys of the pattern where the patterned panel 12 is closest to the opposite panel 14. As suggested by the imaginary double dotted line connecting the second ends of the pattern shown, the second ends lie along an arc. As a result, the distance a between two adjacent air channels is less than the distance b between two adjacent second ends of those air channels. Thus the force created by the evacuating vacuum is spread over a greater area while the air channels remain relatively close together, for example with a distance of 1/16th of an inch from peak to peak of adjacent air channels, to provide crush resistance.

FIGS. 4 through 8 show exemplary patterns of air channels in other embodiments of the invention. The patterns are characterized in that an air channel is spaced apart from an adjacent air channel by no more than a first distance and its second end is spaced apart from a second end of the adjacent air channel by a second distance that is greater than the first distance. In the pattern shown in FIG. 7 the air channels have a "wave" shape along the length which may enhance the resistance to collapsing when the bag is being evacuated. For the purposes of this specification air channels are described as being parallel when the perpendicular distance between them is substantially constant throughout their lengths; thus the air channels shown in FIG. 7 would be described as parallel.

Figure 8:
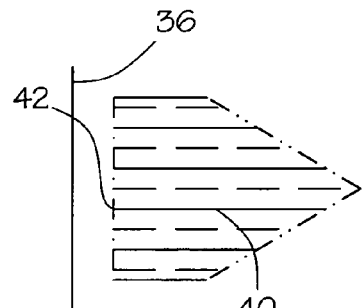

The first end 42 of each air channel 40 is adjacent the unjoined edge 36 of the bag. Adjacent is used to mean that the first end is near the edge of the bag, either extend right to the edge as shown or spaced within a small distance, preferably less than one-half inch from the edge. FIG. 8 shows an exemplary pattern of air channels in another embodiments of the invention in which the adjacent first end 42 of the air channel 40 is somewhat spaced apart from the unjoined edge 36.

Figure 9:
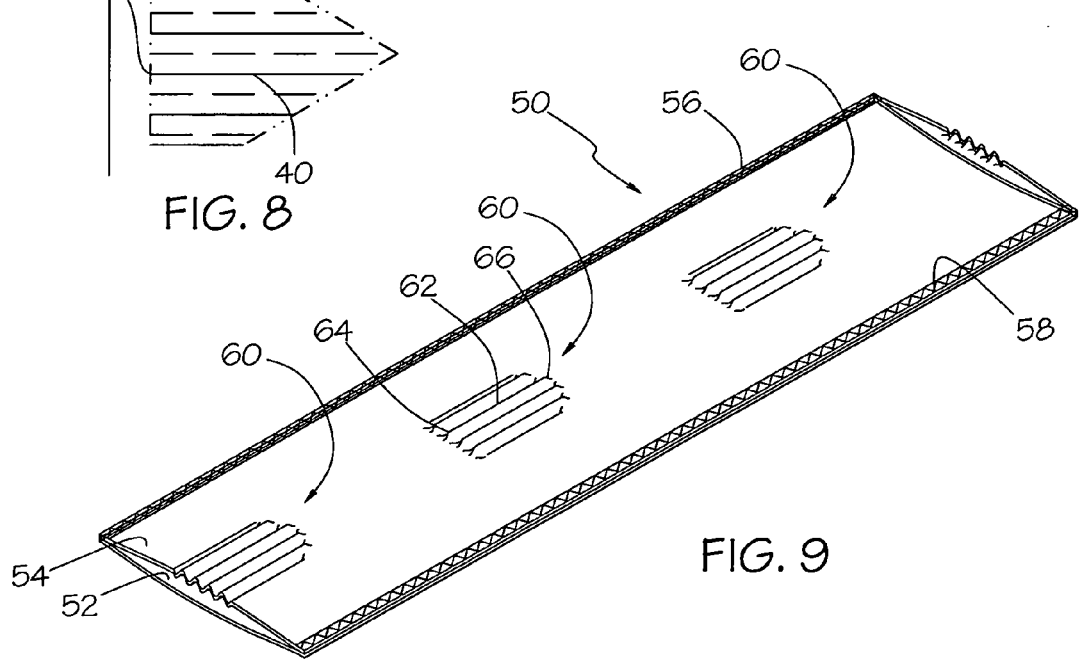
FIG. 9 is a pictorial view of a tubular element that embodies the invention.

FIG. 9 illustrates a tubular element 50 that embodies the invention. The tubular element may be used for forming plastic bags by cutting a length and sealing one of the cut ends to form a plastic bag similar to the bag illustrated in FIG. 1. The tubular element includes a first sheet of plastic film 52 and a second sheet of plastic film 54. Each sheet of plastic film includes an oxygen barrier and a heat sealable surface and has two opposing longitudinal edges 56, 58. The longitudinal edges of each sheet are joined to the adjacent longitudinal edges of the other sheet with the heat sealable surfaces facing one another.

At least one of the plastic sheets 56 includes a plurality of embossed patterns 60 spaced apart along the length of the plastic sheet. Each of the embossed patterns 60 includes a plurality of air channels 62, each of the plurality of air channels having a first end 64 and an opposing second end 66. The embossed pattern may be similar to any of the patterns of air channels discussed above. The first end 64 of each of the plurality of air channels 62 may lie substantially on a straight line perpendicular to the longitudinal edges 56, 58. The second end 66 of each of the plurality of air channels 62 may be closer to the first end 64 of the air channel of the embossed pattern than a first end of an air channel of an adjacent embossed pattern. Thus, a bag formed from the tubular element 50 may provide more than half its depth free of embossed patterns.

In another embodiment (not shown), both ends of the air channel are arranged as described for the second ends 66 described above. In this embodiment, the straight first ends of the air channels are formed by later cutting the embossed pattern substantially in half to form two embossed patterns of the type described above.

Each of the plurality of air channels 62 is spaced apart from an adjacent air channel by no more than a first distance. Each of the plurality of second ends 66 is spaced apart from an adjacent second end by a second distance that is greater than the first distance. As explained above, this arrangement of air channels may reduce the tendency of the air channels to be pinched shut during the evacuation of a bag prior to making a heat sealed closure.

The tubular element 50 may be formed from a single sheet of plastic film and one of the pair of joined longitudinal edges 56 may be a fold in the sheet of plastic film. The tubular element 50 may be formed by extrusion and both pairs of joined longitudinal edges 56, 58 may be folds in the extruded plastic tube. One or both of the sheets may be a laminated sheet including a heat sealable substrate and a gas impermeable substrate. The heat sealable substrate may be one of any number of materials with a low melting point such as polyethylene or polypropylene. The gas impermeable substrate may be one of any number of materials such as nylon, polyester, aluminum foil, metallized thermoplastic, or high melting point polypropylene.

A plastic bag of the types described above may be formed by joining a first panel of substantially rectangular plastic film that includes a first oxygen barrier and a first heat sealable surface to a second panel of substantially rectangular plastic film that includes a second oxygen barrier and a second heat sealable surface. The second panel may have substantially the same dimensions as the first panel. The second panel is joined to the first panel by three joined edges with the first and second heat sealable surfaces facing one another.

The joined panels may be formed by forming a tubular element in which the opposing longitudinal edges are joined. A length may be cut from the tubular element and one of the cut ends joined to provide substantially the same structure as described as being formed from two panels.

The second panel is embossed with a pattern including a plurality of air channels of the type described above. The embossing may be performed using pressure and heat to form the air channels. The pattern may be embossed in the plastic panel before some or all of the edges are joined. In another embodiment of the method of forming the bag, the pattern may be embossed at the open end of a bag after the three remaining edges are joined. Because the embossed pattern has a relatively small area, it may be possible to emboss the pattern with a handheld tool.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A plastic bag comprising:

a first panel of substantially rectangular plastic film that includes a first oxygen barrier and a first heat sealable surface; and a second panel of substantially rectangular plastic film that includes a second oxygen barrier and a second heat sealable surface, the second panel having substantially the same dimensions as the first panel, the second panel joined to the first panel by three joined edges with the first and second heat sealable surfaces facing one another, the second panel including a plurality of air channels, each of the plurality of air channels having a first end and an opposing second end, wherein the first end of each of the plurality of air channels is adjacent an edge of the second panel that is not joined to the first panel, each of the plurality of air channels extends toward the joined edges from the first end to the second end, the second end of each of the plurality of air channels is closer to the unjoined edge than the joined edges, each of the plurality of air channels is spaced apart from an adjacent air channel by no more than a first distance, and each of the plurality of second ends makes a transition to a flat area of the second sheet that is spaced apart from a transition of an adjacent second end by a second distance that is greater than the first distance.

2. The plastic bag of claim 1 wherein the first and second panels are formed from a single sheet of plastic film and one of the pair of joined edges of the first and second panels is a fold in the sheet of plastic film.

3. The plastic bag of claim 1 wherein at least one of the first and second panels is a laminated sheet including a heat sealable substrate and a gas impermeable substrate.

4. The plastic bag of claim 3 wherein the heat sealable substrate is polyethylene or polypropylene.

5. The plastic bag of claim 3 wherein the gas impermeable substrate is nylon, polyester, aluminum foil, metallized thermoplastic, or high melt polypropylene.

6. The plastic bag of claim 1 wherein the air channels are parallel and each air channel is of a different length than an adjacent air channel.

7. The plastic bag of claim 1 wherein the plurality of air channels extend across less than a width of the edge of the second panel that is not joined to the first panel.

8. The plastic bag of claim 1 wherein the first panel is flat and a majority of the second panel is flat.

\* \* \* \* \*